US010953775B1

(12) United States Patent
Maloney et al.

(10) Patent No.: US 10,953,775 B1
(45) Date of Patent: Mar. 23, 2021

(54) SEAT ASSEMBLY WITH CUSHIONED COMPONENTS HAVING AN INTEGRATED AIR CHANNELING SYSTEM

(71) Applicant: Ford Global Technologies, LLC, Dearborn, MI (US)

(72) Inventors: Patrick Maloney, Livonia, MI (US); Victoria Leigh Schein, Dearborn, MI (US); Alex Perkins, Detroit, MI (US); Vishal Vinayak Nageshkar, Farmington Hills, MI (US); Sangram Tamhankar, Canton, MI (US); Christian J. Hosbach, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/781,037

(22) Filed: Feb. 4, 2020

(51) Int. Cl.
*B60N 2/56* (2006.01)

(52) U.S. Cl.
CPC .......... *B60N 2/565* (2013.01); *B60N 2/5635* (2013.01)

(58) Field of Classification Search
CPC .... B60N 2/565; B60N 2/5635; B60N 2/5621; B60N 2/5607; B60N 2/5628; B60N 2/5657
USPC ................................... 297/180.14
See application file for complete search history.

(56) References Cited

U.S. PATENT DOCUMENTS

| 4,143,916 | A * | 3/1979 | Trotman | A47C 7/74 297/452.45 |
| 5,444,881 | A * | 8/1995 | Landi | A61G 5/1043 5/708 |
| 6,189,966 | B1 * | 2/2001 | Faust | B60N 2/5635 297/180.13 |
| 6,541,737 | B1 * | 4/2003 | Eksin | B60H 1/00792 219/217 |
| 7,213,876 | B2 * | 5/2007 | Stoewe | B60N 2/5635 297/180.1 |
| 7,510,239 | B2 | 3/2009 | Stowe | |
| 9,456,702 | B2 * | 10/2016 | Miyata | A47C 27/125 |
| 10,343,565 | B2 | 7/2019 | Baek et al. | |
| 10,357,955 | B2 | 7/2019 | Ziolek | |

(Continued)

FOREIGN PATENT DOCUMENTS

DE 102013218223 A1 2/2015
DE 102018119660 A1 2/2019

*Primary Examiner* — Mark R Wendell
(74) *Attorney, Agent, or Firm* — David Coppiellie; Price Heneveld LLP (57) ABSTRACT

A seat assembly includes a seat portion and a seatback. A cushioned component is disposed in either the seat portion or the seatback. The cushioned component includes a porous lattice matrix and non-porous first and second walls that are disposed within and surrounded by the lattice matrix. The first and second walls are spaced-apart from one another and disposed at opposed angles to define a channel therebetween. The lattice matrix and the first and second walls are deformable structures for supporting a seat occupant while still being able to channel air through the cushioned component. The lattice matrix and the first and second walls are contemplated to be integrally formed components defining a monolithic structure. The lattice matrix may include multiple sets of spaced-apart walls for channeling air through different portions of the cushioned component.

20 Claims, 5 Drawing Sheets

(56) References Cited

U.S. PATENT DOCUMENTS

| | | | |
|---|---|---|---|
| 2005/0200166 A1* | 9/2005 | Noh | B60N 2/5678 |
| | | | 297/180.14 |
| 2007/0063551 A1 | 3/2007 | Gasic et al. | |
| 2012/0272457 A1* | 11/2012 | Allman | A47C 27/15 |
| | | | 5/716 |
| 2014/0007761 A1* | 1/2014 | Haidar | B60N 2/4415 |
| | | | 89/36.02 |
| 2015/0274049 A1* | 10/2015 | Langensiepen | B60N 2/5642 |
| | | | 297/180.12 |
| 2017/0182561 A1* | 6/2017 | Scancarello | B33Y 80/00 |
| 2018/0022251 A1* | 1/2018 | Kienzler | B60N 2/565 |
| | | | 297/180.12 |
| 2018/0043805 A1* | 2/2018 | Baek | B60N 2/5642 |
| 2018/0178693 A1* | 6/2018 | Iyer | B60N 2/002 |
| 2018/0361894 A1* | 12/2018 | Wolf | B60N 2/002 |
| 2019/0118682 A1* | 4/2019 | Faruque | B60N 2/78 |
| 2019/0168647 A1* | 6/2019 | Line | B60N 2/7017 |
| 2019/0298072 A1* | 10/2019 | Bhatia | B60N 2/5642 |
| 2019/0351787 A1* | 11/2019 | Lodhia | B60N 2/0244 |
| 2020/0122615 A1* | 4/2020 | Herbst | B60N 2/986 |

* cited by examiner

SEAT ASSEMBLY WITH CUSHIONED COMPONENTS HAVING AN INTEGRATED AIR CHANNELING SYSTEM

FIELD OF THE INVENTION

The present invention generally relates to a seat assembly, and more particularly to a seat assembly having cushioned components with integrated air channeling systems for directing airflow.

BACKGROUND OF THE INVENTION

Adjustable comfort settings for a seat assembly are desired. A seat assembly having an integrated air channeling system for directing airflow within cushioned components of the seat assembly provides users an adjustable comfort setting for the seat assembly while maintaining a desired seat assembly profile.

SUMMARY OF THE INVENTION

According to one aspect of the present invention, a seat assembly includes a cushioned component having a porous lattice matrix. An air channeling system is disposed within the lattice matrix and includes one or more sets of opposed walls spaced-apart from one another to define a channel therebetween. The one or more sets of opposed walls are non-porous walls. The air channeling system and the lattice matrix are integrated components defining a monolithic structure.

According to another aspect of the present invention, a seat assembly includes a cushioned component having a porous lattice matrix comprised of a pattern of interconnected links. First and second walls are surrounded by the lattice matrix and spaced-apart from one another to define a channel therebetween. The first and second walls are non-porous walls including first ends spaced-apart from one another a first distance to define a first opening of the channel. Second ends of the first and second walls are spaced-apart from one another a second distance that is less than the first distance to define a second opening of the channel.

According to yet another aspect of the present invention, a seat assembly includes a seat portion, a seatback and a cushioned component is disposed in either the seat portion or the seatback. The cushioned component includes a porous lattice matrix. First and second walls are disposed within the lattice matrix and spaced-apart from one another to define a channel therebetween. The first and second walls are non-porous walls disposed at opposed angles to direct air through the channel along an airflow path defined between a first side of the cushioned component and a second side of the cushioned component. A manifold includes a body portion in fluid communication with the channel, wherein the manifold further includes an outwardly opening exhaust port.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1, 2:
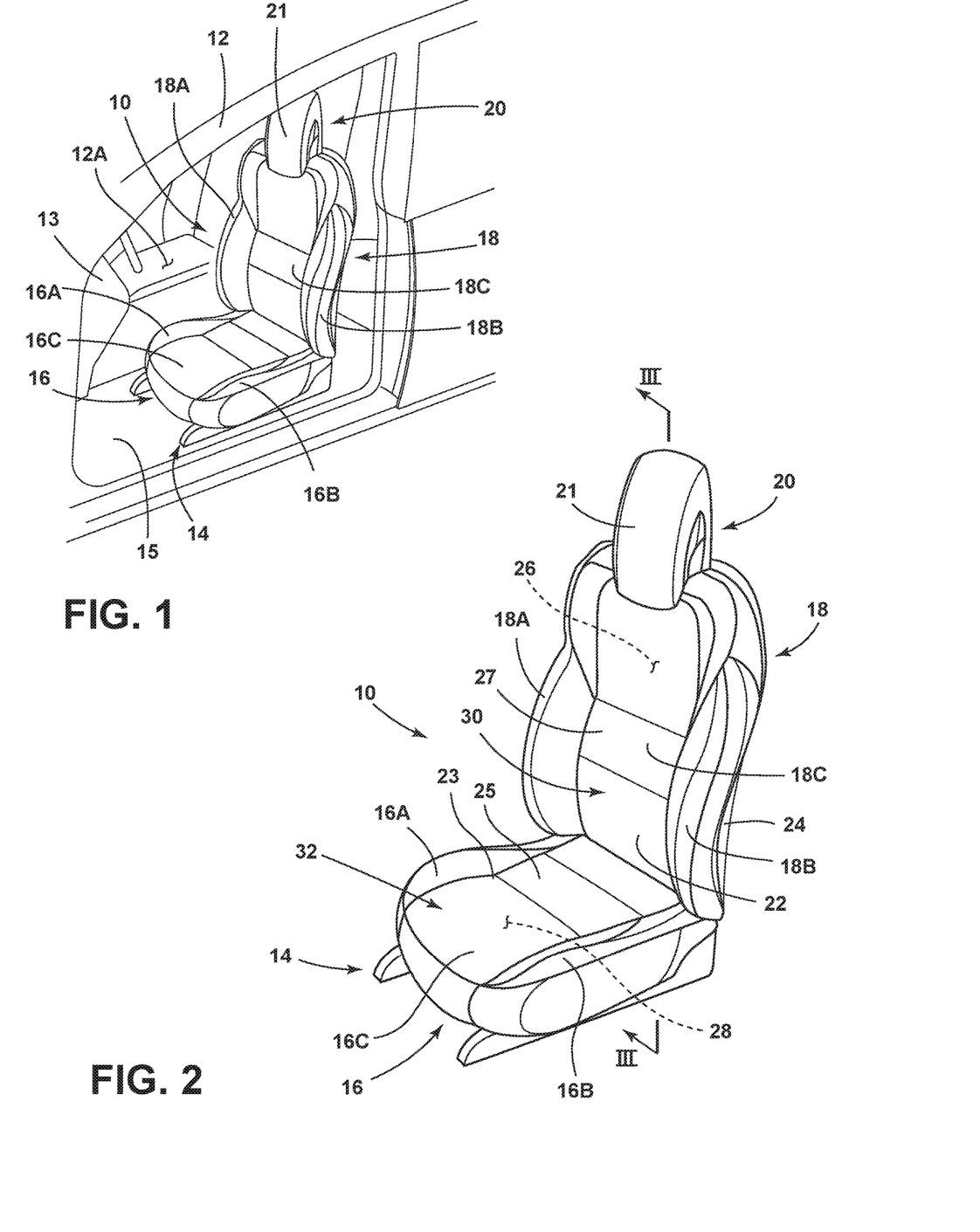
FIG. 1 is a top perspective view of a seat assembly positioned within a vehicle interior.
FIG. 2 is a top perspective view of the seat assembly of FIG. 1 as removed from the vehicle interior.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within a vehicle interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed in other seat assemblies positioned in other areas of a vehicle interior 12A, such as the passenger side seating area, a rear seating area, or a third row seating option. The seat assembly 10 is supported on a track system 14 disposed on a vehicle floor support surface 15, and generally includes a substantially horizontal seat portion 16 and a substantially upright seatback 18. It is contemplated that the seatback 18 is a pivoting member configured for pivotal movement relative to the seat portion 16 between upright and reclined positions. The seat portion 16 generally includes a central support portion 16C having protruding fins or side bolsters 16A, 16B disposed on opposite sides thereof. The side bolsters 16A, 16B are generally disposed at an inward angle directed towards the central support portion 16C. The side bolsters 16A, 16B of the seat portion 16 are configured to provide support for a vehicle occupant as seated in the seat assembly 10 when the vehicle 12 is in motion. Similarly, the seatback 18 includes side bolsters 18A, 18B and a central support portion 18C. The side bolsters 18A, 18B of the seatback 18 are generally angled towards the central support portion 18C of the seatback 18.

Referring now to FIG. 2, the various parts of the seat portion 16 and the seatback assembly 18 are covered with seat covers 23, 22, respectively. The seat covers 23, 22 may be comprised of a suitable natural or synthetic material, such as leather, imitation leather, vinyl, clothe, or any combination thereof, that generally covers cushion materials and frame components of the seat assembly 10. It is further contemplated that the seat covers 23, 22 may be comprised of a perforated or breathable material to allow airflow through the seat portion 16 and the seatback 18 of the seat assembly 10. As shown in FIG. 2, the seatback 18 includes a close-out rear panel 24. Together, the rear panel 24 and the seat cover 22 surround an interior 26 of the seatback 18 to define the same. The seatback 18 further includes a cushioned component 30 that at least partially defines the central support portion 18C of the seatback 18. An outer contact surface 27 is provided on the seatback 18 and is configured to engage or contact a back of a seat occupant seated in the seat assembly 10. Similarly, the seat portion 16 includes a cushioned component 32 that at least partially defines the central support portion 16C of the seat portion 16. In FIG. 2, the seat cover 23 of the seat portion 16 covers and conceals an interior 28 of the seat portion 16. An outer contact surface 25 is provided on the seat portion 16 and is configured to contact a seat occupant seated in the seat assembly 10.

Figure 3:
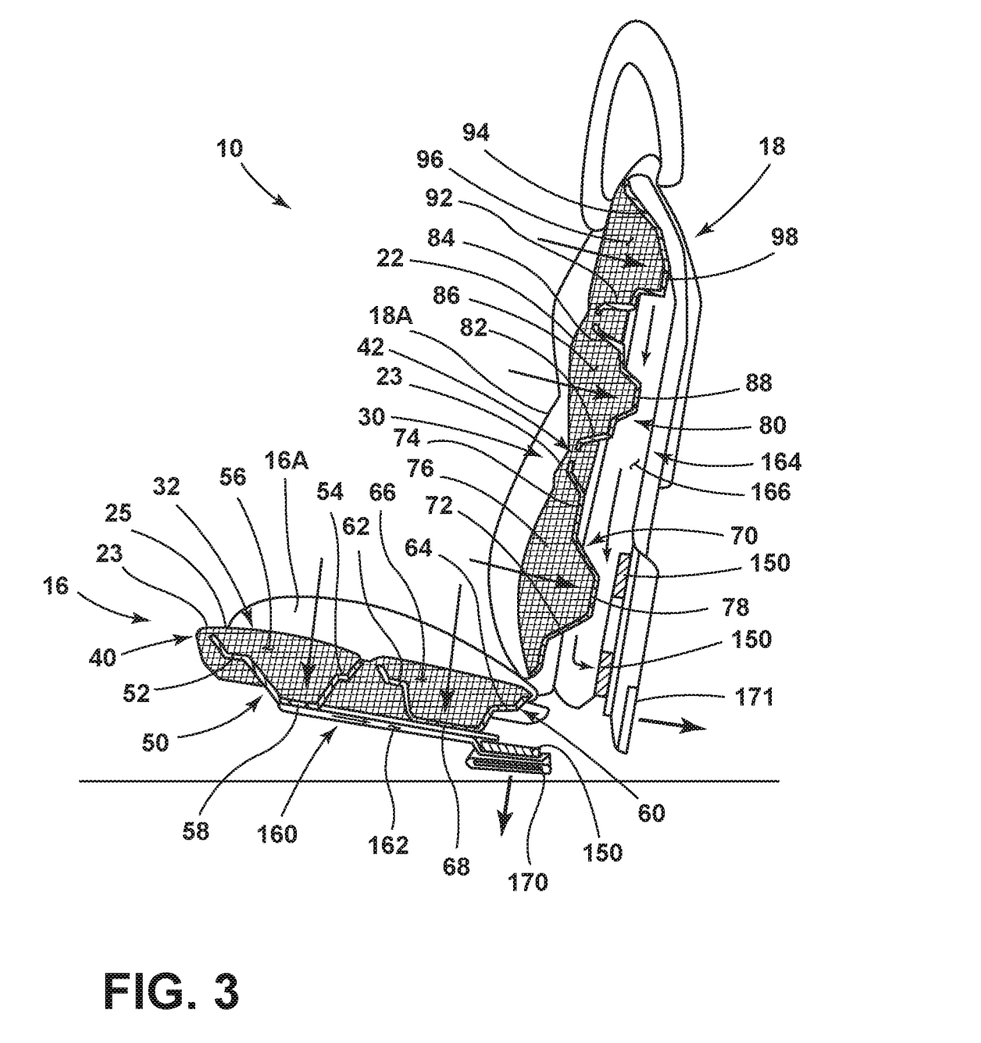
FIG. 3 is a cross-sectional view of the seat assembly of FIG. 1 taken at line III.

Referring now to FIG. 3, a seat assembly 10 is shown having a cushioned component 32 disposed in the seat portion 16 and a cushioned component 30 disposed in the seatback 18. The cushioned components 30, 32 of the seat assembly 10 include a number of features in common that may be described with like reference numerals. With reference to the seat portion 16, the cushioned component 32 disposed therein includes a lattice matrix 40 that is contemplated to be a porous lattice matrix to allow airflow through the cushioned component 32. Similarly, with reference to the seatback 18, the cushioned component 30 disposed therein includes a lattice matrix 42 that is contemplated to be a porous lattice matrix to allow airflow through the cushioned component 30. The cushioned component 32 of the seat portion 16 includes a first set of walls 50 and a second set of walls 60. The first and second sets of walls 50, 60 include non-porous walls 52, 54 and 62, 64, respectively, that are integrated into the lattice matrix 40 and positioned within the lattice matrix 40 to direct airflow through the cushioned component 32. Similarly, the cushioned component 30 of the seatback 18 includes a first set of walls 70, a second set of walls 80, and a third set of walls 90. The first, second and third sets of walls 70, 80, 90 also include non-porous walls 72, 74 and 82, 84 and 92, 94, respectively, that are integrated into the lattice matrix 42 and positioned within the lattice matrix 42 to direct airflow through the cushioned component 30.

As used herein, the term "lattice matrix" refers to a structural pattern of interconnected links that define cells or voids therebetween, wherein the overall pattern resembles an expanded material configuration. The cushioned components discussed herein are contemplated to be comprised of a single material used in an additive manufacturing process to form the lattice matrices thereof into monolithic structures. In this way, the cushioned components of the present concept include fully integrated component parts comprised of a common material that define overall monolithic structures. As used herein, the term "integrated" refers to component parts of a unitary whole that are formed together to provide the monolithic structure of the overall article. In this way, the term "integrated" is used herein to describe component parts that are formed together is a unitary whole, as opposed to components that are separately formed and later operably coupled to one another in assembly. As used herein, the term "monolithic structure" is used to describe a structure that is integrally formed in a forming process, such as an additive manufacturing technique. Additive manufacturing techniques contemplated for use with the present concept may include 3D printing, laser sintering and other known additive manufacturing techniques. In this way, the monolithic structures of the present concept provide unitary structures comprised of multiple configurations and features. It is noted that the monolithic structures of the present concept may include a single or common material used in the additive manufacture of the structure. Further, the cushioned components of the present concept are not only monolithic in structure, but are specifically configured to provide variated density profiles within lattice matrices thereof. As used herein, the term "density profile" is used to describe a relative hardness of a cushioned component or the lattice matrix thereof. Density profiles are comparable between components, wherein a greater density profile describes a component part that has reduced deflection capabilities as compared to a component part with increased deflection capabilities (i.e. lesser density profile). Thus, the cushioned components, or the lattice matrices thereof, of the present concept include density profiles that vary from one another to provide variated comfort settings for a seat assembly. A density profile takes into account a degree of deflection of a part under a given force and can be expressed as a softness, or more likely, a hardness of the part.

As used herein, the terms "deflectable" or "deformable" refer to a component that is considered to be cushioning in nature, such that the component is compressible when under pressure from an applied force. The terms "deflectable" or "deformable" are also used herein to describe a component part that is flexibly resilient. In this way, a deflectable component part is contemplated to be a part that can be compressed from an at-rest condition to a compressed condition under a compression force, and is further contemplated to resiliently return to the at-rest condition from the compressed condition after the compression force is removed. Thus, a deflectable or deformable lattice matrix described herein acts as a cushioning component of a seat assembly that can support a seat occupant in a compressed or deformed condition and return to an at-rest condition when the seat occupant is removed from the seat assembly.

With further reference to FIG. 3, the first set of walls 50 is disposed within a front portion of the lattice matrix 40 of the cushioned component 32. As noted above, the first set of walls 50 includes first and second walls 52, 54 which are opposed walls disposed at opposed angles relative to one another. The first and second walls 52, 54 are spaced-apart from one another to define a channel 56 therebetween. Given the angled position of the first and second walls 52, 54 of the first set of walls 50, the channel 56 tapers from an upper portion positioned adjacent the outer contact surface 25 of the seat portion 16, towards a lower opening 58 defined between the first and second walls 52, 54. The lower opening 58 opens into a manifold 160 having a body portion 162 that defines an airflow pathway directed towards an exhaust port 170. In this way, the body portion 162 of the manifold 160 is fluidically coupled with the channel 56 via the lower opening 58 of the channel 56. In this way, air is channeled through the lattice matrix 40 of the cushioned component 32 by the first set of walls 50 via the channel 56 to the manifold 160, and then out the exhaust port 170. As such, the exhaust port 170 is contemplated to open outwardly from the cushioned component 32. Movement of air through the cushioned component 32 and manifold 160 is powered by a fan assembly 150. It is contemplated that the exhaust port 170 exhausts air pulled through the cushioned component 32 by the fan assembly 150 into the ambient space surrounding the seat assembly 10 (i.e. the vehicle cabin). Thus, the fan assembly 150 is disposed within the body portion 162 of the manifold 160 and is positioned to draw air from the channel 56 to the exhaust port 170, as further described below.

Much like the first set of walls 50, the second set of walls 60 shown in FIG. 3 includes the first and second walls 62, 64 configured in a spaced-apart relationship to define a channel 66 therebetween that tapers from an upper portion towards a lower opening 68. The second set of walls 60 is disposed at a rear portion of the cushioned component 32 of the seat portion 16. The lower opening 68 of the second set of walls 60 opens into the body portion 162 of the manifold 160, wherein the drawn air is then exhausted through the exhaust port 170. Air directed through the lattice matrix 40 at the channels 56, 66 defined by the first and second sets of walls 50, 60, respectively, is indicated by the arrows downwardly directed towards the respective lower openings 58, 68 through the cushioned component 32. As shown in FIG. 3, the walls 52, 54 and 62, 64 are integrated into the lattice matrix 40, such that the lattice matrix 40 fills the channels 56, 66 defined between the first and second sets of walls 50, 60, respectively. As noted above, the lattice matrix 40 is a porous lattice matrix comprised of interconnected links defining spaces or voids therebetween that allow the air to flow through the lattice matrix 40, even as disposed between the non-porous walls 52, 54 and 62, 64 of the first and second sets of walls 50, 60. In this way, the cushioned component 32 of the seat portion 16 includes an air channeling system defined by the first and second sets of walls 50, 60, and the channels 56, 66, that is integrally formed with the lattice matrix 40 to define a unitary body or monolithic structure for the cushioned component 32.

With further reference to FIG. 3, the cushioned component 30 of the seatback 18 includes the lattice matrix 42 having the first, second and third sets of walls 70, 80, and 90, as described above. The first set of walls 70 is disposed within a lower portion of the lattice matrix 42 of the cushioned component 30 of the seatback 18. As noted above, the first set of walls 70 includes first and second walls 72, 74 which are opposed walls disposed at opposed angles relative to one another. The first and second walls 72, 74 are spaced-apart from one another to define a channel 76 therebetween. Given the angled position of the first and second walls 72, 74 of the first set of walls 70, the channel 76 tapers from a front portion positioned adjacent the outer contact surface 27 of the seatback 18, towards an inner opening 78 defined between the first and second walls 72, 74. The inner opening 78 opens into a manifold 164 having a body portion 166 that defines an airflow pathway directed towards an exhaust port 171. In this way, air is channeled through the lattice matrix 42 of the cushioned component 30 by the first set of walls 70 to the manifold 164, and then out the exhaust port 171. Movement of air through the cushioned component 30 and manifold 164 is contemplated to be powered by one or more fan assemblies 150. It is contemplated that the exhaust port 171 exhausts air pulled through the cushioned component 30 by the fan assemblies 150 into the ambient space surrounding the seat assembly 10 (i.e. the vehicle cabin). Much like the first set of walls 70, the second set of walls 80 of the seatback 18 shown in FIG. 3 includes the first and second walls 82, 84 configured in a spaced-apart relationship to define a channel 86 therebetween that tapers from an outer portion, disposed adjacent the outer contact surface 27, towards an inner opening 88. The inner opening 88 of the second set of walls 80 of the seatback 18 also opens into the body portion 166 of the manifold 164, wherein the drawn air is then exhausted through the exhaust port 171. Much like the first and second set of walls 70, 80, the third set of walls 90 of the seatback 18 is disposed at an upper portion of the seatback 18. In this way, the first set of walls 70 is disposed at the lower portion of the seatback 18, the second set of walls 80 is disposed at an intermediate portion along the seatback 18, and the third set of walls 90 is disposed at the upper portion of the seatback 18. The third set of walls 90 includes the first and second walls 92, 94 configured in a spaced-apart relationship to define a channel 96 therebetween that tapers from an outer portion, disposed adjacent the outer contact surface 27, towards an inner opening 98. The inner opening 98 of the third set of walls 90 of the seatback 18 also opens into the body portion 166 of the manifold 164, wherein the drawn air is then exhausted through the exhaust port 171.

As further shown in FIG. 3, the walls 72, 74 and 82, 84 and 92, 94 are integrated into the lattice matrix 42, such that the lattice matrix 42 fills the channels 76, 86 and 96 defined between the first, second and third sets of walls 70, 80 and 90, respectively. As noted above, the lattice matrix 42 is a porous lattice matrix comprised of interconnected links defining spaces or voids therebetween that allow the air to flow through the lattice matrix 42, even as disposed between the non-porous walls 72, 74 and 82, 84 and 92, 94 of the first, second and third sets of walls 70, 80 and 90, respectively. In this way, the cushioned component 30 of the seatback 18 includes an air channeling system defined by the first, second and third sets of walls 70, 80 and 90, and the channels 76, 86 and 96, that is integrally formed with the lattice matrix 42 to define a unitary body or monolithic structure for the cushioned component 30. Air directed through the lattice matrix 42 at the channels 76, 86 and 96 defined by the first, second and third sets of walls 70, 80 and 90, respectively, is indicated by the arrows directed inwardly towards the respective inner openings 78, 88 and 98 through the cushioned component 30.

Figure 4:
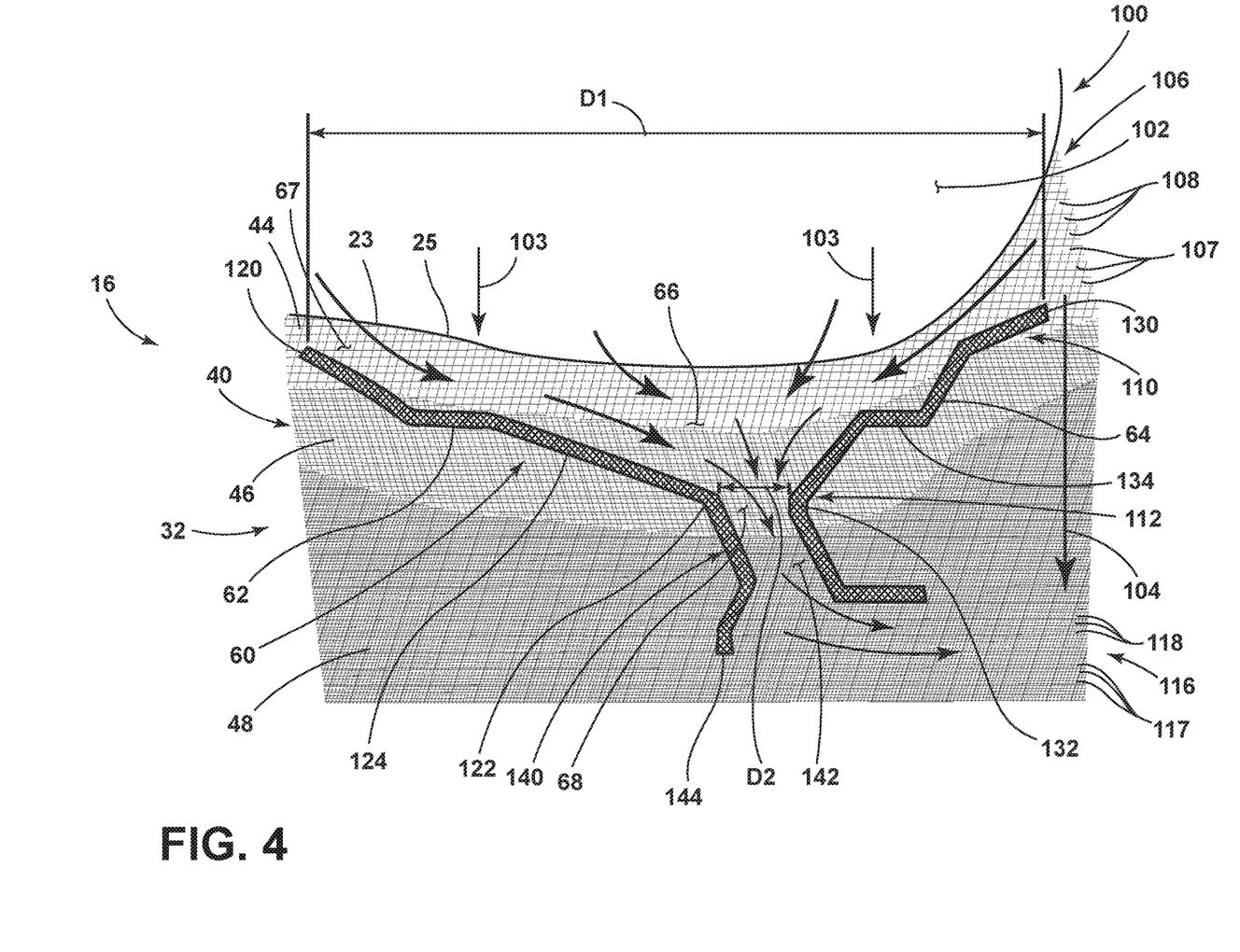
FIG. 4 is a side elevation view of a zoomed-in view of a cushioned component of the seat assembly of FIG. 3 showing a seat occupant seated thereon.

Referring now to FIG. 4, a seat occupant 100 is shown seated on the cushioned component 32 of the seat portion 16. Specifically, a seat 102 of the seat occupant 100 is shown in contact with the outer contact surface 25 of the cushioned component 32 of the seat portion 16. In this way, a downward force 103 is exerted by the seat occupant 100 on the cushioned component 32. The lattice matrix 40 of the cushioned component 32 is a deflectable or deformable lattice matrix that acts as a cushioned support for the seat occupant 100. Thus, in FIG. 4, the lattice matrix 40 is shown in a compressed or deformed condition under the downward force 103 of the seated seat occupant 100. It is further contemplated that the lattice matrix 40 is flexibly resilient, such that the lattice matrix 40 is contemplated to reassume its configuration provided in the at-rest condition (FIG. 3) when the downward force 103 of the seat occupant 100 is removed from the cushioned component 32. As shown in FIG. 4, air is still channeled through the cushioned component 32 even while a seat occupant 100 is supported on the cushioned component 32 due to the porous lattice matrix 40 that is still breathable in the deformed condition. The portion of the cushioned component 32 shown in FIG. 4 is contemplated to include the second set of walls 60 positioned in the rear portion of the cushioned component 32. The first and second walls 62, 64 of the second set of walls 60 are illustrated in FIG. 4 and are contemplated to provide an exemplary embodiment of the multiple sets of walls 50, 60, 70, 80 and 90 disposed in both the seat portion 16 and the seatback 18 of the seat assembly 10, as shown in FIG. 3. Thus, the description of the first and second walls 62, 64 of the second set of wall 60 provided herein also describes the walls of the multiple sets of walls 50, 60, 70, 80 and 90 disposed in both the seat portion 16 and the seatback 18 of the seat assembly 10.

With further reference to FIG. 4, the first and second walls 62, 64 of the second set of walls 60 are shown in an opposed configuration and a spaced-apart relationship relative to one another. Specifically, the first wall 62 includes a first end 120 and a second end 122 having a body portion 124 disposed therebetween. Similarly, the second wall 64 includes a first end 130 and a second end 132 having a body portion 134 disposed therebetween. The body portions 124, 134 of the first and second walls 62, 64, respectively, are angled towards each other at opposed angles. The first and second walls 62, 64 are deformable walls which are operable between at-rest conditions, as shown in FIG. 3, and deformed conditions as shown in FIG. 4. The first and second walls 62, 64 are urged to the deformed condition from the at-rest condition under the downward force 103 applied by the seat 102 of the seat occupant 100 in a seated position on the cushioned component 32. The first and second walls 62, 64 are also contemplated to be flexibly resilient, such that the first and second walls 62, 64 are contemplated to reassume their configuration provided in the at-rest condition (FIG. 3) when the downward force 103 of the seat occupant 100 is removed from the cushioned component 32. The deformable condition of the first and second walls 52, 54 of the first set of walls 50 is described below with reference to FIGS. 5 and 6.

As noted above, the channel 66 is defined between the first and second walls 62, 64 of the second set of walls 60. The channel 66 includes an upper opening 67 disposed within an upper portion or first portion 44 of the lattice matrix 40, while the lower opening 68 of the channel 66 is disposed within a lower portion or second portion 48 of the lattice matrix 40. Thus, the channel 66 includes first and second portions 110, 112 which may be described herein as upper and lower portions given the generally vertical position of the channel 66 as disposed within the seat portion 16 of the seat assembly 10. The channels 76, 86 and 96 defined in the seatback 18 of the seat assembly 10, as shown in FIG. 3, also include first and second portions which may be described herein as outer and inner portions given the generally horizontal position of the channels 76, 86 and 96 of the seatback 18. Thus, the upper and lower openings 67, 68 of the channel 66 may be referred to as outer and inner openings when referencing a channel that is generally horizontally disposed, such as a channel disposed in a seatback portion. As noted above, the first and second walls 62, 64 of the second set of wall 60 are non-porous walls, wherein the first ends 120, 130 thereof are spaced-apart from one another a first distance D1 to define the upper opening 67 of the channel 66. The second ends 122, 132 of the first and second walls 62, 64 of the second set of wall 60 are also spaced-apart from one another, but are spaced-apart from one another a second distance D2 that is less than the first distance D1 to define the lower opening 68 of the channel 66. The variation in the first and second distances D1, D2 of the upper and lower openings 67, 68 of the channel 66 provide for the tapered configuration of the channel 66. The tapered configuration of the channel 66 is due to the angle configuration of the first and second walls 62, 64. In this way, the first and second walls 62, 64 provide for an air channeling system to channel air towards the lower opening 68. Air is channeled through the air channeling system given the non-porous nature of the first and second walls 62, 64 that can direct airflow, as opposed to the porous lattice matrix 40 which allows air to pass through. While the first and second walls 62, 64 are shown in the deformed condition in FIG. 4, the channel 66, and the openings 67, 68 thereof, is open to continue to direct airflow through the cushioned component 32 while a seat occupant 100 is seated on the seat portion 16.

As further shown in the embodiment of FIG. 4, the air channeling system may further include a manifold connecting portion 140 that either connects to the manifold 160 (or 164) or directs air thereto. The manifold connecting portion 140 includes a manifold connecting portion channel 142 and an open end 144 through which air can flow into the manifold 160 (or 164). The manifold connecting portion 140 is defined by the first and second wall 62, 64, and is disposed below the channel 66 thereof.

With further reference to FIG. 4, the first portion 44 of the lattice matrix 40 is defined by a first pattern 106 of interconnected links 107 which define a first set of cells 108. The cells 108 generally define voids within the first portion 44 of the lattice matrix 40 as defined in shape and size by the first pattern 106 of interconnected links 107. The spaces or voids defined by the cells 108 of the first portion 44 of the lattice matrix 40 allow the first portion 44 of the lattice matrix 40 to deflect or deform under an applied pressure or downward force 103 of the seated seat occupant 100. Thus, the interconnected links 107 are interconnected with one another, yet spaced-apart from one another to define the cells 108 into which the interconnected links 107 can deform or deflect into. In this way, the lattice matrix 40 is not only a porous lattice matrix, but also a deflectable lattice matrix.

With further reference to FIG. 4, the second portion 48 of the lattice matrix 40 is defined by a second pattern 116 of interconnected links 117 which define a second set of cells 118. The cells 118 generally define voids within the second portion 48 of the lattice matrix 40 as defined in shape and size by the second pattern 116 of interconnected links 117. The spaces or voids defined by the cells 118 of the second portion 48 of the lattice matrix 40 allow the second portion 48 of the lattice matrix 40 to deflect or deform under an applied pressure or force of a seated seat occupant, but not to the degree of deflection or deformation of the first portion 44 of the lattice matrix 40. Thus, the interconnected links 117 of the second pattern 116 of the second portion 48 of the lattice matrix 40 are interconnected with one another, yet spaced-apart from one another to define the cells 118 into which the interconnected links 117 can deform or deflect into, but still provide more rigid support as compared to the first portion 44 of the lattice matrix 40. In this way, the lattice matrix 40 is a deflectable lattice matrix comprised of deflectable first and second portions 44, 48 having variated density profiles, as noted above. Further, the lattice matrix 40 is a porous lattice matrix through which air can flow via the cells 108, 118 which are also disposed throughout the lattice matrix 40 and interconnected with one another throughout the porous network of interconnected links 107, 117 of the lattice matrix 40. The varying density profiles between the first and second portions 44, 48 of the lattice matrix 40 generally correlates to the size of the cells of a particular pattern of interconnected links and a thickness of the links themselves. This is due to the common material contemplated to be used for the additive manufacture of the cushioned component 32. Thus, it is contemplated that the material may not contribute to the density profile, but instead the structure created by the common material will determine the density profile. Thus, it is contemplated that the first set of cells 108 of the first portion 44 of the lattice matrix 40 includes cells 108 comprised of a first size, and it is further contemplated that the second set of cells 118 of the second portion 48 of the lattice matrix 40 includes cells 118 comprised of a second size that is different from the first size of the first set of cells 108. Thus, the size of the cells 108 of the first set of cells 108 is contemplated to be greater than the size of the cells 118 of the second set of cells 118 to provide a less dense and more deflectable first portion 44 of the lattice matrix 40 as compared to the second portion 48 of the lattice matrix 40. Thus, the density profiles of the first and second portions 44, 48 of the lattice matrix 40 comprised of a common material may be due to the thicknesses of the interconnected links, the size of the cells created by the pattern of links, or both. Thus, the first portion 44 of the lattice matrix 40 includes a first density profile, and the second portion 48 of the lattice matrix 40 includes a second density profile that is greater than the first density profile.

As further shown in FIG. 4, and intermediate portion 46 of the lattice matrix 40 is provided between the first portion 44 and the second portion 48. It is contemplated that any number of intermediate portions may be positioned between the first and second portions 44, 48. In this way, the lattice matrix 40 may include a plurality of layers having varying density profiles. As such, it is contemplated that the intermediate portion 46 of the lattice matrix 40 also includes a pattern of interconnected links defining a plurality of cells for providing the intermediate portion 46 with a density profile that is more dense than the first density profile of the first portion 44, and less dense than the second density profile of the second portion 48. In this way, the lattice matrix 40 includes a density gradient 104 of increasing density comprised of the multiple layers or portions of the lattice matrix 40, wherein the multiple layers or portions of the lattice matrix 40 have increasing densities as directed from an outer or upper portion of the lattice matrix 40, to an inner or lower portion of the lattice matrix 40. With reference to the seat portion 16 of the seat assembly 10, the density gradient 104 of the lattice matrix 40 is provided in a vertical direction with density increasing from the first portion 44, to the intermediate portion 46, to the second portion 48. In the embodiment shown in FIG. 4, the first portion 44 of the lattice matrix 40 covers both the intermediate portion 46 and the second portion 48. With reference to the seatback 18 of the seat assembly 10, the density gradient is contemplated to be a horizontal density gradient comprised of multiple layers or portions having increasing densities when moving from an outer portion of the lattice matrix 42 disposed adjacent the outer contact surface 27, towards an inner portion of the lattice matrix 42 disposed adjacent the manifold 164.

As noted above, the walls 52, 54 and 62, 64 are disposed within and surrounded by the lattice matrix 40 of the cushioned component 32 of the seat portion 16. Further, the walls 52, 54 and 62, 64 are contemplated to be non-porous solid walls which are airtight for directing air through the respective channels 56, 66 defined therebetween. While the walls 52, 54 and 62, 64 are contemplated to be solid structures, the walls 52, 54 and 62, 64 are contemplated to be integrally formed with the lattice matrix 40, even given the porous nature of the lattice matrix 40. As such, the lattice matrix 40 and the walls 52, 54 and 62, 64 define a unitary body or monolithic structure that is created using an additive manufacturing technique. The same is true for the walls 72,
74 and 82, 84 and 92, 94 of the seatback 18 with regards to the lattice matrix 42 of the cushioned component 30 disposed therein.

Figure 5:
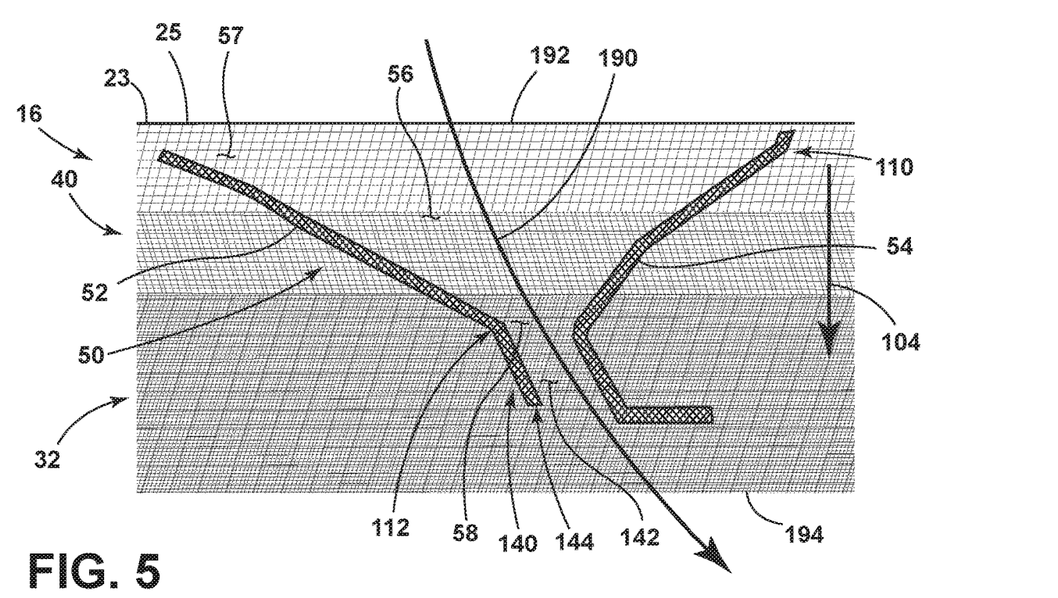
FIG. 5 is a side elevation view of a zoomed-in view of a cushioned component of the seat assembly of FIG. 3 in an at-rest condition.
Figure 6:
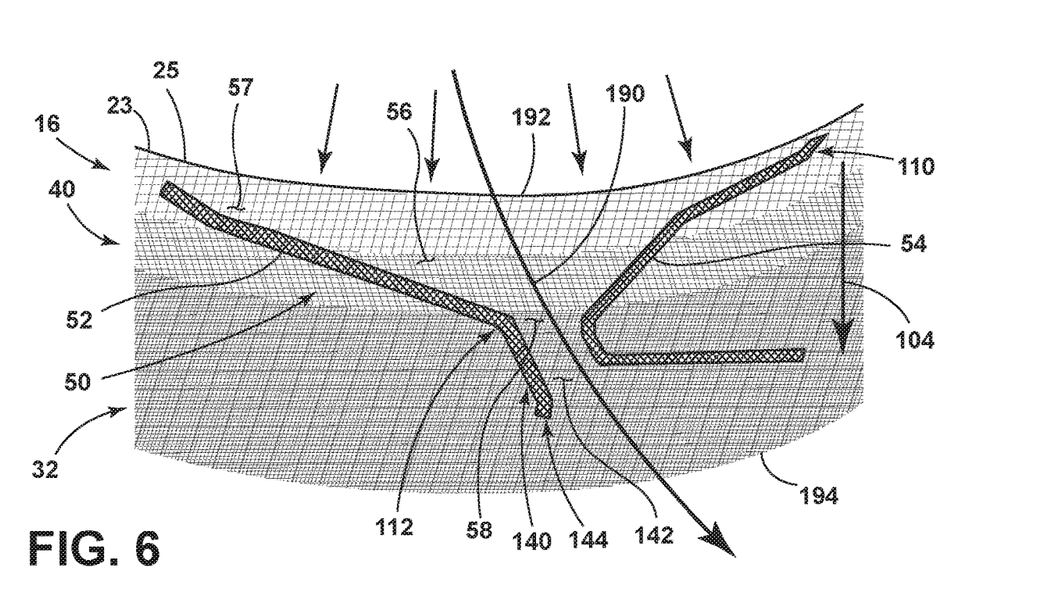
FIG. 6 is a side elevation view of the cushioned component of FIG. 5 in an deformed condition.

Referring now to FIGS. 5 and 6, the first and second walls 52, 54 of the first set of walls 50 are shown in an opposed configuration in a spaced-apart relationship relative to one another. Specifically, the first wall 52 and the second wall 54 are angled towards each other at opposed angles. Much like the first and second walls 62, 64 described above, the first and second walls 52, 54 are also deformable walls which are operable between at-rest conditions, as shown in FIG. 5, and deformed conditions, as shown in FIG. 6. The first and second walls 52, 54 are urged to the deformed condition from the at-rest condition under the downward force applied by a seat occupant supported in a seated position on the cushioned component 32. The first and second walls 52, 54 are also contemplated to be flexibly resilient, such that the first and second walls 52, 54 are contemplated to reassume their configuration provided in the at-rest condition (FIG. 5) when the downward force of a seat occupant is removed from the cushioned component 32. In the deformed or compressed condition shown in FIG. 6, the channel 56 defined between the first and second walls 52, 54 is still open between the upper opening 57 and the lower opening 58 in this way, airflow is directed through the cushioned component 32 along the airflow path indicated by arrow 190 from a first side 192 of the cushioned component 32 to a second side 194 of the cushioned component 32. In this way, the cushioned component 32 provides an airflow path 190 that is open and accessible even when a force is applied to the cushioned component 32 by a seat occupant. Thus, not only is the lattice matrix 40 of the cushioned component 32 deformable, but so too are the non-porous first and second walls 52, 54 of the air channeling system as integrated into the lattice matrix 40. In FIGS. 5 and 6, the density gradient 104 is shown as being disposed through multiple layers of the lattice matrix 40 with an increasing density indicated from the first side 192 of the cushioned component 32 to the second side 194 of the cushioned component 32.

Figure 7:
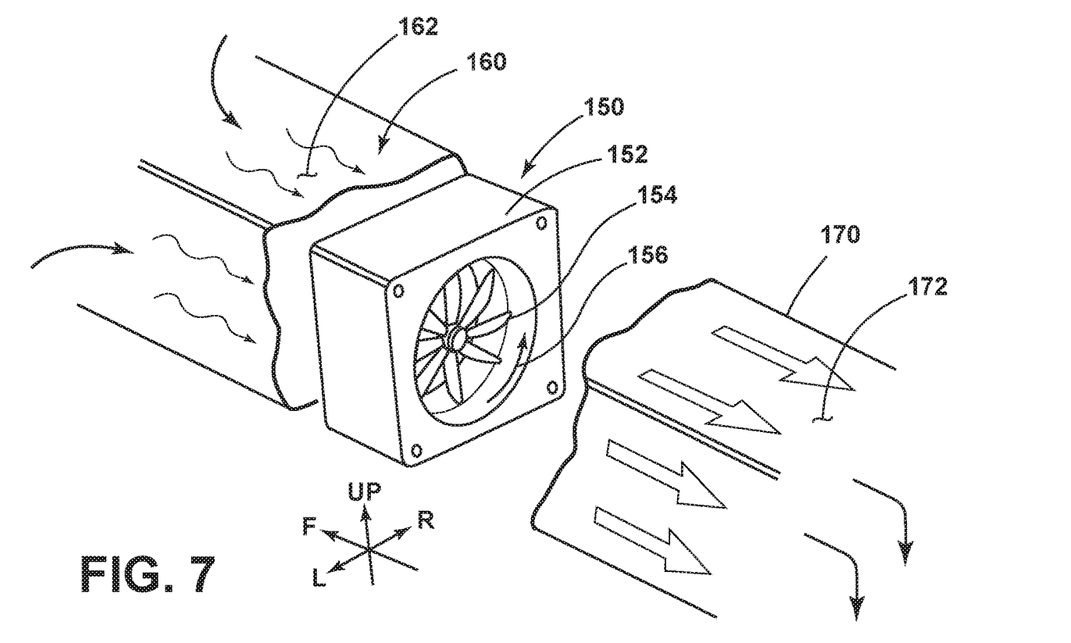
FIG. 7 is a top perspective view of a fan assembly disposed between a manifold and an exhaust port.

Referring now to FIG. 7, the fan assembly 150 is shown disposed within the body portion 162 of the manifold 160. The fan assembly 150 includes an axial fan 154 positioned within a fan housing 152 for rotation in the direction as indicated by arrow 156. In this way, the fan assembly 150 can direct air from the various channels 56, 66 of the cushioned component 32, or the channels 76, 86 and 96 of the cushioned component 30, to the exhaust port 170. The exhaust port 170 may include an exhaust port channel 172 disposed downstream from the fan assembly 150 and leading to the ambient space disposed around the seat assembly 10.

Figure 8:
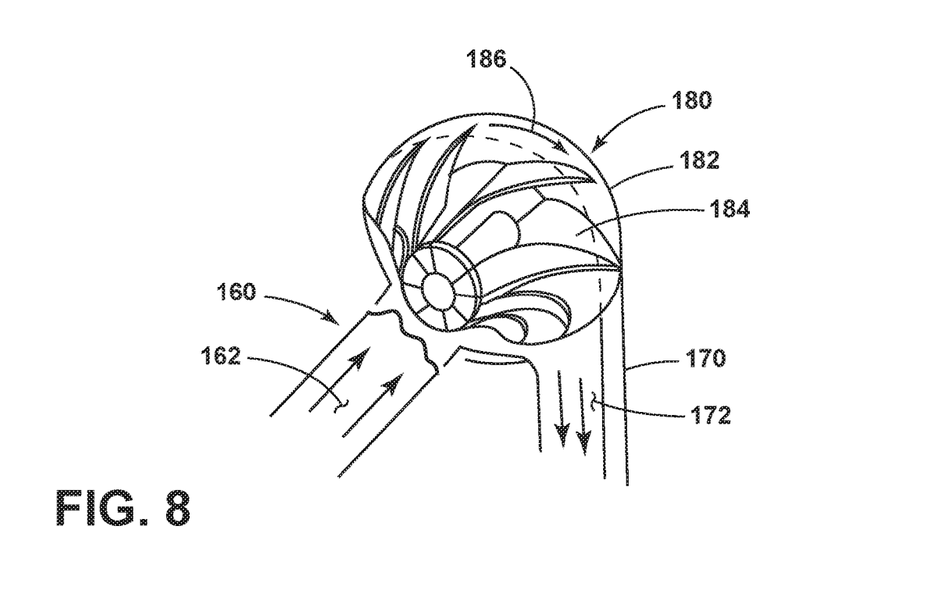
FIG. 8 is a top perspective view of a fan assembly disposed between a manifold and an exhaust port.

Referring now to FIG. 8, a fan assembly 180 may also be in fluid communication with the manifold 160 for directing air to the exhaust port 170 using a centrifugal fan assembly 184 configured for rotation in the direction as indicated by arrow 186. In the embodiment shown in FIG. 8, the centrifugal fan assembly 184 is disposed within a fan housing 182 and directs air towards the exhaust port 170 in a direction that is different than the air being drawn through the manifold 160.

According to one aspect of the present invention, a seat assembly includes a cushioned component having a porous lattice matrix. An air channeling system is disposed within the lattice matrix and includes one or more sets of opposed walls spaced-apart from one another to define a channel therebetween. The one or more sets of opposed walls are non-porous walls. The air channeling system and the lattice matrix are integrated components defining a monolithic structure.

Embodiments of the first aspect of the invention can include any one or a combination of the following features:
- the lattice matrix is comprised of a pattern of interconnected links which defines a plurality of cells disposed through the lattice matrix and interconnected with one another;
- the channel includes an upper opening disposed adjacent to an upper portion of the lattice matrix.
- the channel includes a lower opening disposed adjacent to a lower portion of the lattice matrix that is disposed below the upper portion;
- the upper portion of the lattice matrix includes a first density profile, and the lower portion of the lattice matrix is covered by the upper portion and includes a second density profile that is greater than the first density profile;
- the lattice matrix includes a density gradient comprised of multiple layers of the lattice matrix having increasing density as directed from an upper portion of the lattice matrix to a lower portion of the lattice matrix;
- a manifold having a body portion fluidically coupled to the channel that includes an exhaust port opening outwardly from the cushioned component; and
- a fan assembly disposed within the body portion of the manifold and positioned to draw air from the channel to the exhaust port.

According to another aspect of the present invention, a seat assembly includes a cushioned component having a porous lattice matrix comprised of a pattern of interconnected links. First and second walls are surrounded by the lattice matrix and spaced-apart from one another to define a channel therebetween. The first and second walls are non-porous walls including first ends spaced-apart from one another a first distance to define a first opening of the channel. Second ends of the first and second walls are spaced-apart from one another a second distance that is less than the first distance to define a second opening of the channel.

Embodiments of the second aspect of the invention can include any one or a combination of the following features:
- the first and second walls and the lattice matrix are integrated components defining a monolithic structure;
- the cushioned component is disposed within one of a seatback and a seat portion of the seat assembly;
- the first and second walls are deformable walls operable between deformed and at-rest conditions;
- the first and second walls include body portions disposed at opposed angles relative to one another;
- the lattice matrix includes a plurality of layers from an outer portion of the lattice matrix to an inner portion of the lattice matrix; and
- a density gradient of increasing density is defined along the plurality of layers of the lattice matrix from the outer portion of the lattice matrix towards the inner portion of the lattice matrix.

According to yet another aspect of the present invention, a seat assembly includes a seat portion, a seatback and a cushioned component is disposed in either the seat portion or the seatback. The cushioned component includes a porous lattice matrix. First and second walls are disposed within the lattice matrix and spaced-apart from one another to define a channel therebetween. The first and second walls are non-porous walls disposed at opposed angles to direct air through the channel along an airflow path defined between a first side of the cushioned component and a second side of the cushioned component. A manifold includes a body portion in fluid communication with the channel, wherein the manifold further includes an outwardly opening exhaust port.

Embodiments of the third aspect of the invention can include any one or a combination of the following features:
- a fan assembly disposed within the body portion of the manifold and positioned to draw air from the channel to the outwardly opening exhaust port;
- the first and second walls include outer ends spaced-apart from one another a first distance to define an outer opening of the channel and inner ends spaced-apart from one another a second distance that is less than the first distance to define an inner opening of the channel;
- the lattice matrix includes a density gradient of increasing density as directed from the first side of the cushioned component to the second side of the cushioned component; and
- the first and second walls and the lattice matrix are integrally formed to define a monolithic structure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
   a cushioned component having a porous lattice matrix; and
   an air channeling system disposed within the lattice matrix and having one or more sets of opposed walls spaced-apart from one another to define a channel therebetween, wherein the one or more sets of opposed walls are non-porous walls, and further wherein the air channeling system and the lattice matrix are integrated components defining a monolithic structure.

2. The seat assembly of claim 1, wherein the lattice matrix is comprised of a pattern of interconnected links which defines a plurality of cells disposed through the lattice matrix and interconnected with one another.

3. The seat assembly of claim 1, wherein the channel includes an upper opening disposed adjacent to an upper portion of the lattice matrix.

4. The seat assembly of claim 3, wherein the channel includes a lower opening disposed adjacent to a lower portion of the lattice matrix that is disposed below the upper portion.

5. The seat assembly of claim 4, wherein the upper portion of the lattice matrix includes a first density profile, and further wherein the lower portion of the lattice matrix is covered by the upper portion and includes a second density profile that is greater than the first density profile.

6. The seat assembly of claim 1, wherein the lattice matrix includes a density gradient comprised of multiple layers of the lattice matrix having increasing density as directed from an upper portion of the lattice matrix to a lower portion of the lattice matrix.

7. The seat assembly of claim 1, including:
   a manifold having a body portion fluidically coupled to the channel, wherein the manifold further includes an exhaust port opening outwardly from the cushioned component.

8. The seat assembly of claim 7, including:
   a fan assembly disposed within the body portion of the manifold and positioned to draw air from the channel to the exhaust port.

9. A seat assembly, comprising:
a cushioned component having a porous lattice matrix comprised of a pattern of interconnected links; and
first and second walls surrounded by the lattice matrix and spaced-apart from one another to define a channel therebetween, wherein the first and second walls are non-porous walls having first ends spaced-apart from one another a first distance to define a first opening of the channel, and second ends spaced-apart from one another a second distance that is less than the first distance to define a second opening of the channel.

10. The seat assembly of claim 9, wherein the first and second walls and the lattice matrix are integrated components defining a monolithic structure.

11. The seat assembly of claim 9, wherein the cushioned component is disposed within one of a seatback and a seat portion of the seat assembly.

12. The seat assembly of claim 9, wherein the first and second walls are deformable walls operable between deformed and at-rest conditions.

13. The seat assembly of claim 9, wherein the first and second walls include body portions disposed at opposed angles relative to one another.

14. The seat assembly of claim 9, wherein the lattice matrix includes a plurality of layers from an outer portion of the lattice matrix to an inner portion of the lattice matrix.

15. The seat assembly of claim 14, wherein a density gradient of increasing density is defined along the plurality of layers of the lattice matrix from the outer portion of the lattice matrix towards the inner portion of the lattice matrix.

16. A seat assembly, comprising:
a seat portion and a seatback;
a cushioned component disposed in one of the seat portion and the seatback, wherein the cushioned component includes a porous lattice matrix;
first and second walls disposed within the lattice matrix and spaced-apart from one another to define a channel therebetween, wherein the first and second walls are non-porous walls disposed at opposed angles to direct air through the channel along an airflow path defined between a first side of the cushioned component and a second side of the cushioned component; and
a manifold having a body portion in fluid communication with the channel, wherein the manifold further includes an outwardly opening exhaust port.

17. The seat assembly of claim 16, including:
a fan assembly disposed within the body portion of the manifold and positioned to draw air from the channel to the outwardly opening exhaust port.

18. The seat assembly of claim 16, wherein the first and second walls include outer ends spaced-apart from one another a first distance to define an outer opening of the channel and inner ends spaced-apart from one another a second distance that is less than the first distance to define an inner opening of the channel.

19. The seat assembly of claim 16, wherein the lattice matrix includes a density gradient of increasing density as directed from the first side of the cushioned component to the second side of the cushioned component.

20. The seat assembly of claim 16, wherein the first and second walls and the lattice matrix are integrally formed to define a monolithic structure.

\* \* \* \* \*